(12) United States Patent
Catelli

(10) Patent No.: US 7,517,432 B2
(45) Date of Patent: Apr. 14, 2009

(54) PLANT FOR CONCENTRATION OF TOMATO JUICE

(75) Inventor: Roberto Catelli, Parma (IT)

(73) Assignee: CFT S.p.A., Parma (IT)

( * ) Notice: Subject to any disclaimer, the term of this patent is extended or adjusted under 35 U.S.C. 154(b) by 423 days.

(21) Appl. No.: 10/569,954

(22) PCT Filed: Jul. 29, 2004

(86) PCT No.: PCT/IB2004/002547

§ 371 (c)(1),
(2), (4) Date: Feb. 28, 2006

(87) PCT Pub. No.: WO2005/027664

PCT Pub. Date: Mar. 31, 2005

(65) Prior Publication Data

US 2006/0260764 A1    Nov. 23, 2006

(30) Foreign Application Priority Data

Sep. 19, 2003    (IT)    .......................... MO2003A0254

(51) Int. Cl.
*A23L 2/10*    (2006.01)
*B01D 1/10*    (2006.01)
*B01D 1/28*    (2006.01)

(52) U.S. Cl. .................. 159/27.1; 99/275; 159/24.1; 159/901; 202/237

(58) Field of Classification Search .................. 99/275, 99/316; 159/24.1, 27.1, 37, 44, 901; 202/237
See application file for complete search history.

(56) References Cited

U.S. PATENT DOCUMENTS 6,309,513 B1 *  10/2001  Sephton ...................... 202/155
6,666,956 B1 *  12/2003  Nishimura et al. ............. 203/1

FOREIGN PATENT DOCUMENTS

| GB | N17145 A | 7/1914 |
| GB | 669 928 | 4/1952 |
| GB | 686 375 | 1/1953 |
| GB | 937 623 | 9/1963 |
| WO | WO 91/01654 | 2/1991 |

OTHER PUBLICATIONS

Database WPI, Section Ch, Week 197846, Derwent Publications Ltd., London GB; AN 1978-82952A, XP002303847 & JP 53 116272 A (Hitachi Ship & Eng Co Ltd) Oct. 11, 1978 abstract.

* cited by examiner

Primary Examiner—Virginia Manoharan
(74) Attorney, Agent, or Firm—Young & Thompson

(57) ABSTRACT

A plant for tomato juice concentration uses a falling-film evaporator with an external sleeve which surrounds a vertical bundle of tubes divided into a plurality of sectors in which the tomato juice circulates in succession, and which is combined with a heat exchanger which is arranged externally of the evaporator and which is divided into a plurality of sectors in each of which the tomato juice is circulated and heated as it exits from a sector of tubes of the evaporator before being introduced into a successive sector. The plant also includes a compressor that aspirates steam from a bottom zone, being a separation chamber of the evaporator, compresses it and reintroduces it into the central part of the evaporator.

4 Claims, 1 Drawing Sheet

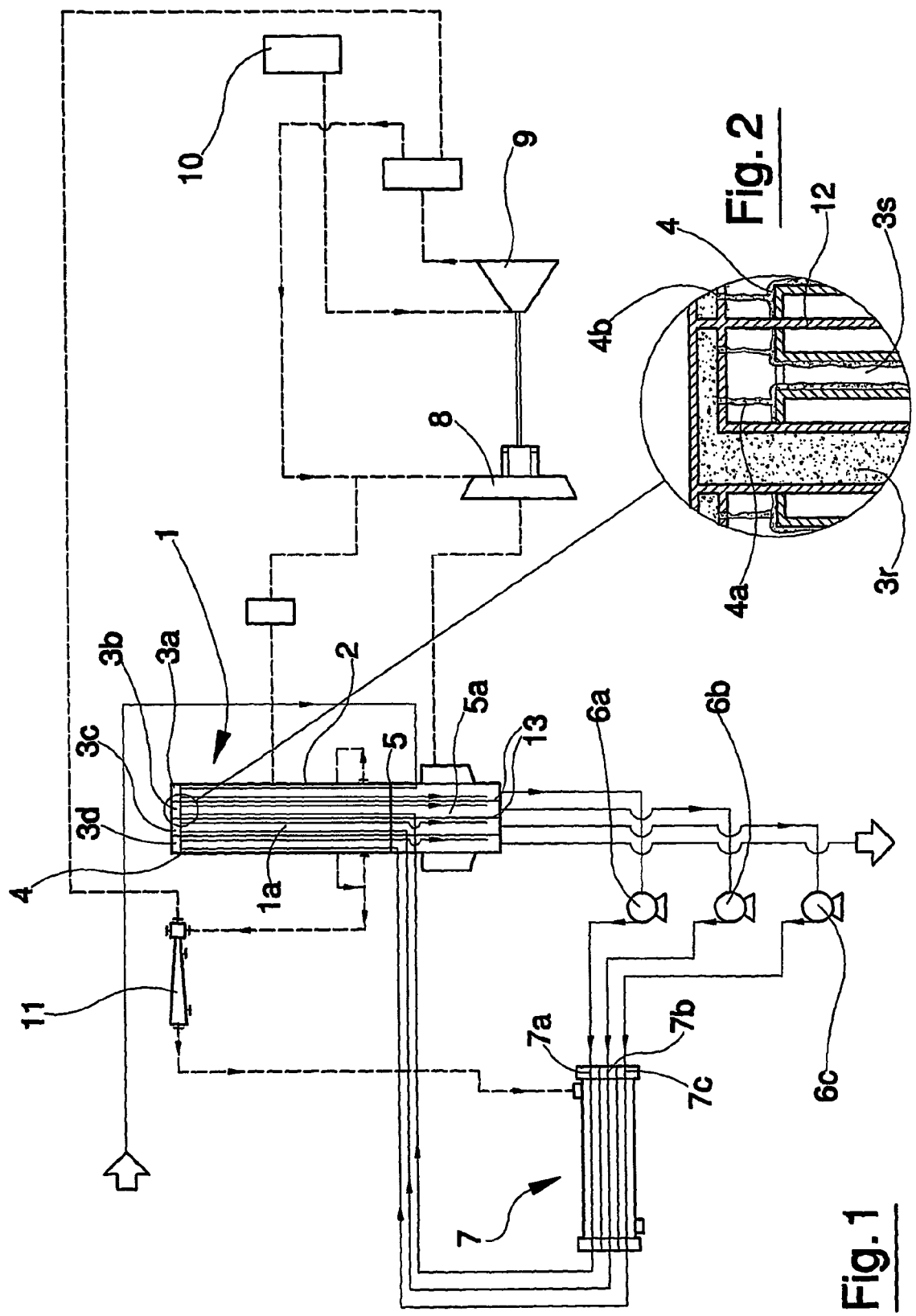

PLANT FOR CONCENTRATION OF TOMATO JUICE

This is a 371 National Stage application of International application no. PCT/IB2004/002547 filed Jul. 29, 2004, which claims priority to Italian application MO2003A000254 filed Sep. 19, 2003. The entire contents of the above-referenced applications are hereby incorporated by reference in their entirety.

TECHNICAL FIELD

The invention relates to a plant for concentrating tomato juice.

BACKGROUND OF THE INVENTION

Normally, in the concentrating of tomato juice, multi-effect concentration plants are used which, very briefly, achieve concentration by evaporating the water content of the juice. This is done by regulating the temperature and pressure (depression) by various amounts in the single plant effects. The plants function well but in terms of construction are rather complex and require precise regulating as the temperature and pressure levels in the various effects are of critical importance. Furthermore, for good plant performance, the temperature of some of the effects has to be rather high, with the chance of negative consequences regarding the product itself.

The prior art contains falling film concentration plants which comprise an evaporator provided with a vertical tube bundle in which a plurality of tubes is arranged, ends of which are keyed on two parallel plates, respectively an upper plate and a lower plate, so that the upper ends of the tubes open into an inlet zone of the product, while the lower ends of the tubes open into a bottom zone of the evaporator, known as the separation chamber, in which the juice loses water by self-evaporation (flash), cools, and exits to be sent on to successive operations.

The tubes are closed in a sleeve, generally cylindrical and delimited by the two parallel plates, internally of which a heating fluid circulates, which is generally steam produced by a boiler and subsequently laminated by special valves which reduce pressure and temperature thereof in order to bring the values up to the desired ones. In this way the external surface of the tubes is struck by the heating fluid, while their internal surfaces are occupied by a falling film of product, which, as it heats up, loses water in the form of steam and therefore becomes concentrated. In these plants the tube bundle is often divided into two or more sectors which are all closed within the sleeve of the evaporator and are thus all working at the same temperature. In this case the product which falls from the first section of tubes and arrives at the separation chamber is returned to the top of the tube bundle through a return tube arranged internally of the tube bundle; during its upward return the product, which had cooled in the separation chamber due to evaporation, is heated once more, although it is normally at a slightly lower temperature than the saturation temperature internally of the chamber; and once it has reached to top of the evaporator the product is made to fall in the following sectors. The product is then extracted from the separation chamber, once it has passed through the final section. These plants, and their operation, are established in the prior art.

These plants, which, with respect to multi-effect concentration plants, are easy to regulate and function at lower temperatures, are generally used for low-viscosity products, such as for example clear juices or milk serum, but are not suitable for high-viscosity products and products with a large presence of sugars and fibres, such as for example tomato juice. Though these plants are undoubtedly simple, they do, however present certain drawbacks connected to the impossibility of guaranteeing a homogeneous distribution of the product along the walls of the tubes as well as to the great difficulty of regulating the thickness of the falling film of product as it descends along the internal walls of the tubes. The thickness of the film is, in fact, not regulated in any way which can be called certain and satisfactory, although many attempts have been made to regulate the product inlet delivery or its distribution on the upper plate, from which the product is distributed into the various tubes. Furthermore, the production of steam which occurs inside the tubes is not sufficient to guarantee a regular descent of the product along the internal walls of the tubes, especially the tubes in the sectors subsequent to the first, where the product, due to the concentration achieved in the preceding passages, has a greater density and a slightly lower temperature than that of the operating evaporator, as the product during the return upwards does not reach the internal temperature of the evaporator.

SUMMARY OF THE INVENTION

The main aim of the present invention is to obviate the drawbacks in the prior art by providing a plant for concentration of tomato juice which is simple to regulate and able to function at lower temperatures with respect to those needed in multiple-effect plants.

An advantage of the invention is that it enables optimisation of the energy necessary for the operation of the whole plant.

These aims and advantages and more besides are all attained by the invention as it is characterised in the appended claims.

Further characteristics and advantages of the present invention will better emerge from the detailed description that follows of a preferred but non-exclusive embodiment of the invention, illustrated purely by way of non-limiting example in the accompanying figures of the drawings, in which:

DETAILED DESCRIPTION OF THE DRAWINGS

FIG. 1 is a diagram of an embodiment of the plant of the invention.

FIG. 2 is a detail of a sector of tubes of the evaporator of FIG. 1.

DETAILED DESCRIPTION OF THE INVENTION

With reference to the figures of the drawings, 1 denotes in its entirety an evaporator, overall of known type, which is provided with an external sleeve, generally cylindrical, internally of which there is a heating fluid.

Internally of the evaporator and more precisely in a central part 1$a$ thereof delimited by the sleeve, an upper plate 4 and a lower plate 5, a bundle of tubes is arranged, constituted by vertical tubes (3$s$, 3$r$) in which the tomato juice to undergo concentration circulates. The tubes are differentiated, as will be better described herein below, into return tubes 3$r$ and descending tubes 3$s$ for the tomato juice.

A juice inlet and distribution zone 4$a$ is located in the evaporator above the upper plate 4. The inlet 4$a$ is superiorly delimited by a distribution plate 4$b$. There is also a bottom zone, or separation chamber 5$a$ below the lower plate 5, in which chamber the tomato juice falling from the tubes (3$s$, 3$r$)

is collected and from which, as will be better clarified herein below, the concentrated tomato juice is extracted.

The lower ends of the tubes (3s, 3r) are keyed on the lower plate 5; the upper ends of the tubes 3s are keyed on the upper plate 4, while the upper ends of the tubes 3r cross the upper plate 4 and are keyed on the distribution plate 4b, which is provided with holes through which the juice falls and is distributed in the inlet zone 4a before it enters the tubes 3s and falls towards the chamber 5a of the evaporator.

Dividing walls 12 and 13 are located in zones 4a and 5a, which enable the tubes (3s, 3r) to be subdivided into a plurality of sectors 3a, 3b, 3c, 3d in which the tomato juice circulates in succession. The evaporator exhibits, that is, a plurality of sectors of tubes (which in the illustrated embodiment are four in number) arranged in series; all the tubes of the tube bundle are however contained in the sleeve 2 of the central part 1a of the evaporator and are thus externally subjected to the same temperature which exists in the central zone. As in passing from one sector to another the product being worked loses water (by evaporation or self-evaporation), and the juice flow rate diminishes, each sector has a smaller number of tubes than the previous one.

The plant further comprises means for recirculation, which in the preferred embodiment are represented by known-type pumps 6a, 6b, 6c, which take the tomato juice from a sector of the separation chamber and send it, through the return tubes 3r, into the inlet zone of the following sector, thus creating a series of pathways for the tomato juice through the various tube sectors.

The plant of the invention further comprises a compressor 8 which is of known type and which aspirates the steam from the separation chamber 5a zone of the evaporator, compresses it and introduces it into the central part 1a of the evaporator which contains the tube bundle.

The part of the plant described up to now is, however, as mentioned, of known type and normally used for concentrating clear juices, for which type of juices this type of plant does not pose an excessive number of problems.

The plant further comprises a gas turbine 9 of known type, which is powered by live steam coming from a boiler, schematically denoted by 10, generally at a pressure of about 12 bar, which powers the compressor 8. The discharge steam from the turbine, normally at a pressure of about 1.3 bar, is used as a heating fluid necessary for plant operation.

The plant further comprises a heat exchanger 7, for example, a tube bundle exchanger of known type, which is arranged externally of the evaporator 1 and which is supplied by a heating fluid. The heat exchanger is divided into a plurality of sectors 7a, 7b, 7c, into each of which, by means of the pumps 6a, 6b, 6c, the tomato juice is sent when it has exited from a sector of tubes 3a, 3b, 3c of the evaporator 1. Inside the heat exchanger 7, the juice is heated to the same temperature as in the inside of the sleeve 2, i.e. in the central part 1a of the evaporator 1, before being sent into the successive sector. Note that, instead of a heat exchanger divided into several sectors, a plurality of heat exchangers could be used and they could be of a different type to the one indicated herein by way of example.

Also included are one or more heat exchangers external of the evaporator 1, not illustrated in the figures of the drawings, in which the fresh tomato juice is heated before being sent into the first sectors of the evaporator 1.

A steam ejector 11 of known type is included in the plant of the invention. The primary fluid of the ejector 11 is the steam discharging from the turbine 9. The ejector extracts the heating fluid from the central part 1a of the evaporator 1 which contains the tube bundle; the fluid exiting from the ejector 11 is used as a heating fluid for the heat exchanger 7. The plant functions as now described.

The temperature internally of the sleeve in the central zone 1a of the evaporator 1, which includes the tube bundle, is kept at between 72° and 80° C., and in particular at a level of about 75° C., which temperature has been shown to be especially effective in good plant functioning. The temperature internally of the separation chamber 5a of the evaporator 1 is kept at between 67° and 75° C., and in particular at about 70° C., which has been shown to be especially effective for good plant functioning. The relative pressures (depressions) internally of these zones, which are saturated with steam, are determined from the steam saturation diagram.

In the central zone 1a, i.e. internally of the sleeve 2, the desired temperature is obtained by means of injection of steam coming from the outlet of the turbine 9; the condensation is extracted by means of usual condensation extraction systems while the non-condensed steam is extracted in the lower zone of the central zone 1a by the ejector 11 and is used as a heating fluid for the heat exchanger 7. In the separation chamber 5a, the desired temperature is obtained by extraction of steam, done by the compressor 8, which causes a lowering of pressure in the zone, with a consequent self-evaporation of the product and reduction of the temperature; the steam compressed by the compressor 8 is sent, together with the steam coming from the turbine 9, internally of the sleeve 2 containing the tube bundle, i.e. in the central zone 1a of the evaporator 1.

The fresh product, after having been heated to a temperature of 75° C. (or in any case to the temperature present inside the sleeve 2) in pre-heaters supplied by steam coming from the ejector 11, is sent through the return conduit 3r of the first sector of the tube bundle (3s, 3r), into the first sector of the distribution plate 4b; the product reaches, from the holes of the plate 4b, the inlet zone 4a of the juice and from here descends along the internal walls of the tubes 3s of the first sector 3a of the tube bundle. During the fall, the juice, which exchanges heat with the tube walls, produces steam for evaporation; this steam, which falls internally of the tubes towards the separation chamber 5a of the evaporator (from which the steam is aspirated by the compressor 8 which thus reduces the pressure of the steam), determines a regular descent of the juice along the walls of the tubes and keeps the juice viscosity at optimal levels.

When the juice arrives in the sector of the separation chamber 5a, which corresponds to the first tube sector, the juice concentrates further by self-evaporation and consequently cools to a temperature which, in the illustrated example, is 70° C. The pump 6a removes the juice from the separation chamber 5a, sends it to the sector 7a of the heat exchanger 7 in which it is heated to a temperature of 75° C. and introduces it into the return tube of the second sector 3b of tubes and, in the same way as described before, sends it to runs through all the sectors of the evaporator tubes.

Once the juice has reached the final sector of the separation chamber 5a, in the illustrated and described example corresponding to the fourth sector of tubes 3d, the concentrated juice is removed and sent on to following work operations. For example, with the plant of the invention a juice at initial density 4.5 Brix is brought to a final density of 8.5 Brix.

The heating of the juice in the passage from one tube sector to the following one, done by means of a heat exchanger external of the evaporator 1, enables an exact determination of the temperature of the juice entering the various tube sectors, which in the prior art plants is not easily obtainable as they pass the juice only through the return tubes internal of the evaporator 1. During the descent of the juice in the descent tubes, the production of steam by evaporation is precisely controllable and is sufficient to guarantee both correct descent of the juice along the tubes and a desired consistency of the product on the internal wall of the tubes. In this way, even with dense juices rich in sugars and/or fibres, like tomato juice, the concentration plant will function well and can be easily and precisely regulated.

The use of a falling-film evaporator for tomato juice concentration, made possible by the special realisation of the plant of the invention, enables tomato juice to be concentrated at temperatures which are decidedly lower than those necessary in multi-effect concentration plants (which go above 90° C.), with a consequent qualitative improvement of the concentrated juice obtained.

Furthermore, the use of a gas turbine for activating the compressor means using the steam energy produced in the boiler, which steam has however to be laminated in order to be brought to the pressures suitable for introduction into the evaporator, all of which constitutes a considerable energy saving with respect to normal plants, which use compressors powered by electric motors. Thus the electrical plant of the concentration plant is much simplified, a very useful result as the electrical plant, due to the presence of much humidity typical of these plants, is always a rather delicate component.

The invention claimed is:

1. A plant for concentration of tomato juice, said plant comprising:
    an evaporator provided with an external sleeve, in which a heating fluid circulates, and which surrounds a vertical tube bundle,
    said vertical tube bundle arranged in a central part of the evaporator and comprising tubes in which the tomato juice circulates, the tubes being divided into a plurality of sectors all operating at a same temperature and pressure and in which the tomato juice circulates in succession;
    an upper plate and a lower plate, which, together with the sleeve, delimit the central part, on which the upper plate and the lower plate ends of the tubes are keyed in so that the upper ends of the tubes open into an inlet zone of the evaporator in which the tomato juice is distributed, and the lower ends of the tubes open into a bottom zone which is a separation chamber of the evaporator;
    circulating members for removing the tomato juice from one of said plurality of sectors of the separating chamber and sending the tomato juice to an inlet zone of a successive one of said plurality of sectors;
    at least one heat exchanger arranged externally of the evaporator and divided into a plurality of sectors in each said sector the tomato juice exiting from the sector of tubes of the evaporator is heated to a same temperature as a temperature present in the central part of the evaporator, before being sent on to a successive sector.

2. The plant of claim 1, wherein said plant further comprises:
    a compressor for aspirating steam from the separation chamber of the evaporator (1), and for compressing the steam and for introducing the steam into the central part of the evaporator;
    a gas turbine powered by live steam coming from a boiler and powering the compressor;
    wherein discharge steam from the gas turbine constitutes a heating fluid necessary for operation of the plant.

3. The plant of claim 2, wherein said plant further comprises:
    a steam ejector,
    a primary fluid comprising the discharge steam coming from the gas turbine,
    wherein the steam ejector extracts heating fluid from the central part of the evaporator, wherein fluid exiting from the steam ejector constitutes the heating fluid for the heat exchanger.

4. The plant of claim 1, wherein: a temperature internal of the central zone of the evaporator is between 72° and 80° C.; a temperature internal of the separation chamber of the evaporator is between 67° and 75° C.

\* \* \* \* \*